United States Patent
Desai et al.

(10) Patent No.: US 12,440,167 B2
(45) Date of Patent: Oct. 14, 2025

(54) REAL-TIME IN-EAR ELECTROENCEPHALOGRAPHY SIGNAL VERIFICATION

(71) Applicant: META PLATFORMS TECHNOLOGIES, LLC, Menlo Park, CA (US)

(72) Inventors: Maansi Desai, Redmond, WA (US); Antje Ihlefeld, Redmond, WA (US); Morteza Khaleghimeybodi, Bothell, WA (US); Srinivas Kota, Redmond, WA (US); Nava K. Balsam, Woodinville, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 752 days.

(21) Appl. No.: 17/714,971

(22) Filed: Apr. 6, 2022

(65) Prior Publication Data
US 2023/0320669 A1    Oct. 12, 2023

(51) Int. Cl.
*A61B 5/00* (2006.01)
*A61B 5/291* (2021.01)
(Continued)

(52) U.S. Cl.
CPC ............ *A61B 5/7221* (2013.01); *A61B 5/291* (2021.01); *A61B 5/372* (2021.01); *A61B 5/6803* (2013.01);
(Continued)

(58) Field of Classification Search
CPC ....... A61B 5/7221; A61B 5/291; A61B 5/372; A61B 5/6817; A61B 5/7405; A61B 5/6843
See application file for complete search history.

(56) References Cited

U.S. PATENT DOCUMENTS

2013/0296731 A1* 11/2013 Kidmose ................. A61B 5/38
                                                                600/544
2017/0196519 A1*  7/2017 Miller ..................... A61B 5/38
(Continued)

FOREIGN PATENT DOCUMENTS

| EP | 3675525 A1 | 7/2020 |
| WO | 2008139404 A1 | 11/2008 |
| WO | 2009065006 A2 | 5/2009 |

OTHER PUBLICATIONS

Maddox R.K., et al., "Auditory Brainstem Responses to Continuous Natural Speech in Human Listeners," Novel Tools and Methods, 2018, vol. 5, No. 1, 13 pages.
(Continued)

*Primary Examiner* — Eric F Winakur
*Assistant Examiner* — Noah M Healy
(74) *Attorney, Agent, or Firm* — McDermott Will & Schulte LLP

(57) ABSTRACT

A real-time in-ear EEG signal verification system. The system includes an in-ear device (IED) configured to be placed within an ear canal of a user and a controller. The IED includes a speaker configured to present a calibration audio signal to the user, the calibration audio signal being embedded with a predetermined audible feature, and an in-ear electrode configured to be in contact with an inner surface of the ear canal. The controller is configured to instruct the speaker to present the calibration audio signal to the user, and generate neural signal data based on electrical signals from the in-ear electrode. The electrical signals correspond to brain activity of the user in response to the predetermined audible feature. The controller is configured to determine a quality of the generated neural signal data, and perform an action based on the quality of the neural signal data.

20 Claims, 6 Drawing Sheets

(51) Int. Cl.
*A61B 5/372* (2021.01)
*H04R 29/00* (2006.01)

(52) U.S. Cl.
CPC .......... *A61B 5/6817* (2013.01); *A61B 5/7405* (2013.01); *H04R 29/001* (2013.01)

(56) References Cited

U.S. PATENT DOCUMENTS

| | | |
|---|---|---|
| 2021/0161418 A1 | 6/2021 | Kuruvila et al. |
| 2021/0235203 A1 | 7/2021 | Lunner et al. |
| 2023/0050817 A1* | 2/2023 | Gökay ................. A61B 5/6803 |

OTHER PUBLICATIONS

International Preliminary Report on Patentability for International Application No. PCT/US2023/017452, mailed Oct. 17, 2024, 8 pages.
International Search Report and Written Opinion for International Application No. PCT/US2023/017452, mailed Jun. 26, 2023, 10 pages.
Talja S., et al., "Source Analysis of Event-Related Potentials During Pitch Discrimination and Pitch Memory Tasks," Brain Topography, Human Sciences Press, vol. 28, No. 3, Sep. 17, 2013, pp. 445-458.

* cited by examiner

400

```
┌─────────────────────────────────────────────────────────────────────────┐
│ Determine that an in-ear device (IED) is worn by a user by placing the IED in an │
│                          ear canal of the user                          │
│                                   410                                   │
└─────────────────────────────────────────────────────────────────────────┘
                                    │
                                    ▼
┌─────────────────────────────────────────────────────────────────────────┐
│        Present a calibration audio signal to the user via a speaker of the IED        │
│                                   420                                   │
└─────────────────────────────────────────────────────────────────────────┘
                                    │
                                    ▼
┌─────────────────────────────────────────────────────────────────────────┐
│ Generate neural signal data based on electrical signals from an in-ear electrode │
│                                of the IED                               │
│                                   430                                   │
└─────────────────────────────────────────────────────────────────────────┘
                                    │
                                    ▼
┌─────────────────────────────────────────────────────────────────────────┐
│                         Analyze the neural signal data                         │
│                                   440                                   │
└─────────────────────────────────────────────────────────────────────────┘
                                    │
                                    ▼
┌─────────────────────────────────────────────────────────────────────────┐
│           Perform an action based on the analysis of the neural signal data           │
│                                   450                                   │
└─────────────────────────────────────────────────────────────────────────┘
```

FIG. 4

REAL-TIME IN-EAR ELECTROENCEPHALOGRAPHY SIGNAL VERIFICATION

FIELD OF THE INVENTION

The present disclosure generally relates to electroencephalography (EEG), and specifically relates to real-time in-ear EEG signal verification in a wearable device.

BACKGROUND

Electroencephalography (EEG) is a method for recording an electrogram of electrical activity of the brain of a user. More specifically, EEG measures electrical signal voltage fluctuations resulting from electrical activity within large populations of neurons of the brain by using one or more electrodes that are placed in contact with the user's anatomy (e.g., scalp) to generate EEG signal data (e.g., neural signal data, brain signal data). A common EEG analysis technique includes evoked potentials (EP), which involves averaging the EEG activity time-locked to the presentation of a stimulus (e.g., visual, somatosensory, or auditory stimulus (e.g., one or more clicks, chirps, pure tones, and the like)). The EP technique may be useful in capturing EEG signal data that may help measure what the user is attending to (e.g., trying to listen to) in real-time (e.g., in a crowded restaurant) and improve auditory perception of the user. However, traditionally, EEG data is captured using a medical or hospital-grade EEG monitoring equipment having several electrodes placed on the scalp, allowing for the brain's electrical activities to be monitored from multiple angles. Such EEG systems are not suitable for use in a portable, real-time manner, in out-of-clinic settings.

SUMMARY

Embodiments include an in-ear device (IED) of a wearable system that can capture electrical signals corresponding to brain activity of the user in response to stimuli, where the electrical signals can be used for generating EEG signal data that can inform what the user is attending to, and where the wearable system is further capable of performing real-time in-ear EEG signal verification to calibrate the EEG signal data and confirm accuracy of the data.

In one embodiment, a real-time in-ear EEG signal verification system is provided which includes an in-ear device (IED) configured to be placed within an ear canal of a user. The IED includes a speaker configured to present a calibration audio signal to the user, the calibration audio signal being embedded with a predetermined audible feature, and an in-ear electrode configured to be in contact with an inner surface of the ear canal. A controller of the system is configured to instruct the speaker to present the calibration audio signal to the user, and generate neural signal data based on electrical signals from the in-ear electrode. The electrical signals correspond to brain activity of the user in response to the predetermined audible feature. The controller is further configured to determine a quality of the generated neural signal data, and perform an action based on the quality of the neural signal data.

In another embodiment, a method is provided which includes a step of determining that an IED is worn by a user by placing the IED in an ear canal of the user. The IED includes a speaker, and an in-ear electrode configured to be in contact with an inner surface of the ear canal. The method further includes a step of presenting a calibration audio signal to the user with the speaker. The calibration audio signal is embedded with a predetermined audible feature. The method further includes a step of generating electroencephalography (EEG) signal data based on electrical signals from the in-ear electrode. The electrical signals correspond to brain activity of the user in response to the predetermined audible feature. And the method further includes the steps of analyzing the generated EEG signal data, and performing an action based on the analysis.

In yet another embodiment, a non-transitory computer readable medium is provided having a computer-executable program stored thereon. The program includes instructions that, when executed by one or more processors, cause the one or more processors to perform various steps. The steps include a step to determine that an in-ear device (IED) is worn by a user by placing the IED in an ear canal of the user. The IED includes a speaker, and an in-ear electrode configured to be in contact with an inner surface of the ear canal. The steps further include a step to control the speaker to present a calibration audio signal to the user. The calibration audio signal is embedded with a predetermined audible feature. The steps further include a step to generate neural signal data based on electrical signals from the in-ear electrode. The electrical signals correspond to brain activity of the user in response to the predetermined audible feature. The steps further include a step to determine a quality of the neural signal data, and perform an action based on the determined quality of the neural signal data.

BRIEF DESCRIPTION OF THE DRAWINGS

FIG. 4 is a flowchart of a method for calibrating neural signal data, in accordance with one or more embodiments.

Figure 1:
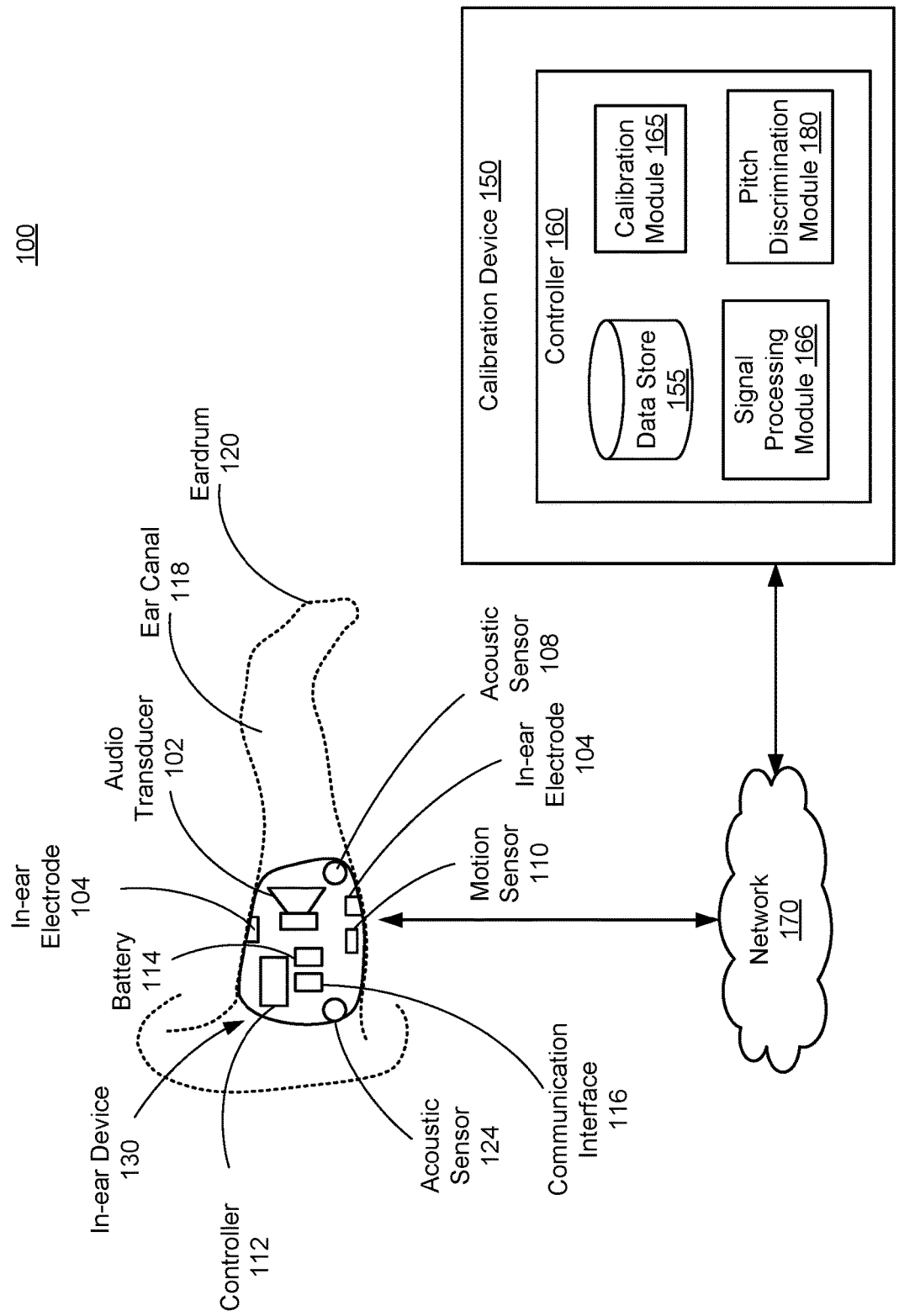
FIG. 1 is a block diagram of an EEG calibration system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

This disclosure pertains to performing real-time in-ear EEG signal verification in a wearable system. Techniques disclosed herein look to provide a wearable system including one or two in-ear devices (IEDs) that are configured to be worn in the ears of a user—e.g., in order to capture electrical signals from the brain of the user. The captured electrical signals may then be processed by a controller (of the IED or of a device provided separately from the IED) to generate EEG signal data (e.g., neural signal data) from a stimulus input. The wearable system is further capable of determining validity of the EEG signal data by performing a calibration operation in which the EEG signal data is analyzed (e.g., a quality of the data is determined), and one or more actions are performed based on the analysis. In effect, by performing the calibration operation, the wearable system is able to confirm in real-time whether or not the generated EEG signal data accurately represents brain activity of the user. As a result, the user of the wearable system can self-validate existence (or absence) of a true neural signal, and if validated, the wearable system may (reliably) use information gleaned from the neural signal data generated in real-time to perform various tasks (e.g., improve audible perception by helping the user bolster audio processing, particularly in noisy environments; identify which person a user is trying to pay attention to in noisy environments and amplify the corresponding audio while attenuating other sounds).

In-ear EEG is a way to record brain activity. The IEDs of the wearable system include sensors (e.g., in-ear electrodes) in the ear canal that pick-up activity from large populations of neurons synchronously firing in response to stimuli (e.g., a plurality of audible clicks). The EEG signal data provides an image of electrical activity in the brain represented as waves of varying frequency, amplitude, and shape over time. This can be used to measure brain activity that occurs during an event—like the completion of a task or the presentation of a stimulus such as speech, or to measure spontaneous brain activity that happens in the absence of a specific event. However, current EEG systems do not have a quick "online" or "portable, real-time" method of ensuring that a user is recording or providing to the wearable system, an intended neural signal. In fact, most of the signal processing and preprocessing in current systems are conducted offline after the electrical signal data from a participant has already been collected. As a result, there is no way to validate the signal quality in real-time. To overcome the above problems, the present disclosure provides a wearable system that is able to capture and generate EEG signal data, calibrate the EEG signal data in real-time by analyzing the EEG signal data, and perform actions based on the analysis.

The wearable system may include one or more controllers. Each controller may include one or more processors. The controllers of the wearable system may separately or in combination be configured to perform functions to carry out the real-time in-ear EEG signal verification operation according to the present disclosure. The controllers may include a controller in one or both of the IEDs, and a controller in a device (e.g., headset, smartphone, portable electronic device, remote device connected to the IED via a network, and the like) that is separate from the IEDs. As described herein, a controller may refer to one or more of the controllers of the wearable system regardless of whether the controller is on the IEDs or on a device separate from the IEDs.

The EEG signal calibration operation may be a part of a startup sequence of the wearable system or may be conducted in response to a user operation. To conduct the EEG signal calibration operation, the controller may control a speaker of the IED to present a calibration audio signal to the user. The calibration audio signal may be embedded with a predetermined audible feature (e.g., snippet of music or other audio content synthesized or embedded with a plurality of clicks or chirps). While the audio signal is being presented, the controller may be configured to control in-ear electrodes in the IED(s) to capture electrical signals corresponding to brain activity of the user. The brain activity may include time-locked neural response of the user in response to the predetermined audible feature that is embedded in the calibration audio signal. The controller may then use the captured electrical signals to generate an EEG signal over time.

The controller may analyze the EEG signal and perform actions based on the analysis. For example, the controller may determine (for one or both IEDs) whether the EEG signal data meets a predetermined amplitude suppression condition and a predetermined time condition following onset of the predetermined audible feature. If yes, the controller may determine that the (one or both) IED is seated well within the ear canal (e.g., in-ear electrode in good contact with the inner surface of the ear canal) and that the EEG signal data is true neural data that accurately represents brain activity of the user in response to stimulus. And in this case, the controller may control to notify the user accordingly (e.g., via a speaker or a display device of the wearable system).

On the other hand, if the EEG signal data does not meet the predetermined amplitude suppression condition or a predetermined time condition following onset of the predetermined audible feature, the controller may control to perform a pitch discrimination operation to determine whether the weaker response or delayed response is due to a hearing-impairment or due to the IED not being seated well within the ear canal or due to a malfunctioning in-ear electrode. The pitch discrimination operation may disambiguate an instance of hearing loss from an instance of the (one or both) TED not being seated well within the ear canal (e.g., in-ear electrode not in good contact with the inner surface of the ear canal), and after the disambiguation, the controller may control to notify the user accordingly (e.g., via a speaker or a display device of the wearable system).

The wearable system is thus able to ensure that the generated EEG signal data is true neural data that accurately represents the brain activity of the user in response to stimulus, before beginning to use the EEG signal data for other applications (e.g., improve auditory perception). The wearable system is further able to notify the user to perform various actions (e.g., adjust position or fit of IED in ear canal, flag for further clinical evaluation for hearing impairment, replace TED or check electrode for malfunction, and the like) based on analysis of the EEG signal data. The calibration system and method thus provide a real-time error detection mechanism that automatically notifies the user whether or not the in-ear electrodes of the IED are in good contact with the inner surface of the ear canal of the user, and if not, whether they need to be readjusted or repositioned for a better fit of the electrodes with the tissue of the user or take other steps.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a block diagram of an EEG calibration system 100, in accordance with one or more embodiments. The EEG calibration system 100 may include an in-ear device (IED) 130, a calibration device 150, and a network 170. The IED 130 fits within an ear canal 118 of a user near an eardrum 120 and captures various types of data from within the ear canal 118. The calibration device 150 includes a controller 160. The calibration device 150 receives data (e.g., EEG signal data, electrical signal data, sensor data) from the IED 130 via the network 170, analyzes the received data, and performs actions based on the analysis. Some embodiments of the IED 130 and the calibration device 150 have different components than those described here. Similarly, in some cases, functions can be distributed among the components in a different manner than is described here. For example, some or all of the processing for real-time in-ear EEG signal verification by the calibration device 150 may be performed by the IED 130. As another example, one or more steps of the processing for real-time in-ear EEG signal verification by the IED 130 as described herein may be performed by the calibration device 150. Although FIG. 1 shows the system 100 including one IED 130, another embodiment of the system 100 may include two IEDs 130, one each for each ear of the user. As shown in FIG. 1, IED 130 may include an audio transducer 102, in-ear electrodes 104, an acoustic sensor 108, a motion sensor 110, a controller 112, a battery 114, a communication interface 116, and an acoustic sensor 124. These components of the IED 130 may be mounted to a circuit board (not shown) that connects the components to each other.

The audio transducer 102 is a speaker that generates sound from audio data and outputs the sound into the ear canal 118. The audio transducer 102 (e.g., notification unit) may be used to present audio content signals to the user. For example, the audio transducer 102 may be used to present the calibration audio signal that is embedded with the predetermined audible feature to the user. The calibration audio signal may be a snippet of an entertaining signal (e.g., speech, music, audio, startup or boot sequence sound, and the like), and the predetermined audible feature may be a stimulus (e.g., one or more clicks, chirps, true tones, and the like) that is known to generate a predetermined neural response in the user as an auditory evoked potential extracted from ongoing electrical activity in the brain of the user and recorded via the in-ear electrodes 104. For example, the calibration audio signal is a snippet of music played at IED startup/power-ON that has been processed/synthesized to embed clicks (e.g., "clicky" music) by tuning the phase response so that the musicality of the snippet is preserved. The audio transducer 102 may also be used to present other types of audio content to the user. For example, an action that is determined based on the calibration operation (e.g., notify user of good contact of in-ear electrode in ear canal, notify user to adjust IED in ear canal, notify user to check for hearing-impairment, and the like) may be notified to the user by presenting appropriate audio content to the user via the audio transducer 102. Further, in some embodiments, the audio transducer 102 re-broadcasts sound from the local area detected by the acoustic sensor 124, such that the IED 130 provides hear-through functionality even though it is occluding the ear canal 118.

The in-ear electrodes 104 capture electrical charges that result from activity in brain cells in response to stimulus (e.g., presenting calibration audio signal with the predetermined audible feature to the user through the user's ear canal 118). The electrical signals captured by the in-ear electrodes 104 may be used to generate EEG signal data defining a waveform over time that represents the electrical activity that is taking place within the brain of the user after the onset of a stimulus, e.g., multiple audible clicks embedded within music. In some embodiments, the in-ear electrodes 104 may be part of a group of in-ear electrodes that may be used to generate different types of electrograms of the brain, eye, heart, and the like (e.g., electroencephalography (EEG), electrocorticography (ECoG or iEEG), electrooculography (EOG), electroretinography (ERG), electrocardiogram (ECG)). Regardless of the type of electrogram, ensuring that the electrode is in good contact with the anatomy of the user is necessary to establish validity of the data captured by the electrode. The in-ear electrodes 104 may thus enable the wearable system to establish validity of electrical signals representing not only brain activity, but also activity of other parts of the anatomy of the user like eyes, heart, and the like.

The in-ear electrodes 104 are positioned at locations on the IED 130 such that they contact an inner surface of the user's ear canal 118 when the IED 130 is worn by the user. In some embodiments, the in-ear electrodes 104 are dry electrodes that may be directly in contact with the anatomy of the user. A dry electrode does not need gel or some other type of medium or layer between the in-ear electrodes 104 and the tissue. The in-ear electrodes 104 may include hard material electrodes (e.g., including gold-plated brass, iridium oxide, etc.) or soft and/or stretchable material electrodes (e.g., including conductive textiles, conductive polymers, carbon allotropes such as graphene or carbon nanotubes, or poly(3,4-ethylenedioxythiophene) polystyrene sulfonate (PEDOT:PSS).

As shown in FIG. 1, the IED 130 may include two in-ear electrodes 104 to generate EEG signal data using the principle of differential amplification by recording voltage differences between different points that compares one active exploring electrode site with another neighboring or distant reference electrode. Other embodiments of the IED 130 may include additional or fewer in-ear electrodes 104 to capture the electrical signals, so long as the differential amplification-based EEG signal data can be generated by the IED(s) 130. In some embodiments, multiple in-ear electrodes 104 may be positioned on the IED 130 to contact different locations of the inner surface of the user's ear or ear canal 118. In some embodiments, a plurality of electrodes may be used to contact a larger surface area within the user's ear in comparison to a single in-ear electrode, potentially improving signal quality. As shown in FIG. 1, the IED 130 may include additional components for capturing other biometric data (e.g., EOG, ECG) of the user (e.g., the acoustic sensor 108 and the motion sensor 110).

As shown in FIG. 1, the IED 130 includes the controller 112 that performs processing to facilitate capturing of sensor data. For example, the controller 112 may control the in-ear electrodes 104 to receive electrical signals captured by the in-ear electrodes 104. In some embodiments, the controller 112 may include a differential amplifier to amplify a difference between voltage signals detected at the in-ear electrodes 104. The controller 112 may also include an analog to digital converter (ADC) that converts the electrical signals from the in-ear electrodes 104 into EEG signal data representing brain activity in response to stimulus over time. The ADC may also convert sensor data from other sensors (e.g., the acoustic sensor 108 and/or the motion sensor 110) into digital data representing waveforms. The controller 112 may be configured to perform additional processing to, e.g., play audio content, record audio content, capture sensor data, perform predetermined processing on the sensor data, and the like. The controller 112 may also include a digital to analog converter (DAC) that converts digital audio data into analog audio data for rendering by audio transducer 102. For example, the controller 112 may provide the calibration audio signal (e.g., snippet of "clicky" music) or other audio content to the audio transducer 102 for rendering to the user. In some embodiments, the controller 112 is further configured to determine when to perform the EEG signal calibration operation. For example, upon determining that the IED 130 has been powered ON, the controller 112 may control the audio transducer 102 to present the calibration audio signal to the user for at least a threshold amount of time (e.g., ~30 seconds). As another example, the controller may control the audio transducer 102 to present the calibration audio signal upon determining that the IED 130 has been placed into the ear canal 118 of the user (e.g., by the motion sensor 110). In some embodiments, while the calibration audio signal is being presented to the user, the controller may also control the in-ear electrodes 104 to capture the electrical signals corresponding to brain activity of the user in response to the presented calibration audio signal. One or more of the features of the controller 112 may be performed by the controller 160 of the calibration device 150. Additional features of the controller 112 according to some embodiments are described below in connection with the controller 160 of the calibration device 150, and FIGS. 2 and 3 below.

The battery 114 provides power to the other components of the IED 130. The battery 114 allows the IED 130 to operate as a mobile device. The battery 114 may be rechargeable via wire or wirelessly.

The communication interface 116 facilitates (e.g., wireless) connection of the IED 130 to other devices, such as the calibration device 150 via the network 170. For example, the communication interface 116 may transfer data (e.g., sensor data) generated by the IED 130 to a monitoring device for analysis and performing actions based on the analysis. The IED 130 may also receive notification data, audio content data, calibration audio signal data, or other types of information from the calibration device 150 via the communication interface 116. In some embodiments, the communication interface 116 includes an antenna and a transceiver.

The calibration device 150 may be configured to receive data collected by the in-ear electrodes 104 and/or other sensors (e.g., from the IED 130 and/or from a headset (FIGS. 2A-2B)) and generate and/or analyze the EEG signal data for real-time in-ear EEG signal verification. In one embodiment, the calibration device 150 is a headset or head-mounted display (HMD), as discussed in greater detail below in connection with FIGS. 2A and 2B. Alternatively, the calibration device 150 may be a device having computer functionality, such as a desktop computer, a laptop computer, a personal digital assistant (PDA), a mobile telephone, a smartphone, a tablet, an Internet of Things (IoT) device, a virtual conferencing device, a cuff, or another suitable device.

The controller 160 may include various components that provide functionality for in-ear EEG signal verification. The components may include, e.g., one or more processors, a data store 155, a calibration module 165, a signal processing module 166, and a pitch discrimination module 180. Some embodiments of controller 160 have different components than those described here. Similarly, in some cases, functions can be distributed among the components in a different manner than is described here.

The data store 155 stores data (e.g., EEG signal data, calibration audio signal data, program instruction data corresponding to the various modules of controller 160, and the like) used by the calibration device 150. The data store 155 may also store data used by the IED 130. The data store 155 (e.g., a non-transitory computer-readable storage medium) and the one or more processors that operate in conjunction to carry out various functions attributed to the calibration device 150 as described herein. For example, the data store 155 may store one or more modules or applications embodied as instructions executable by the one or more processors of the controller 160. The instructions, when executed by the controller 160, cause the controller 160 to carry out the functions attributed to the various modules or applications of the controller 160.

The calibration module 165 may perform real-time in-ear EEG signal verification by causing the calibration audio signal to be presented to the user. To synthesize the calibration audio signal with the audible stimulus (e.g., clicks), the phase response of the sounds may be aligned so that bursts of, e.g., clicks, that are strong enough to evoke neural response are incorporated in the audio signal while the overall magnitude of the audio signal remains the same. The calibration audio signal (synthesized with the predetermined audible feature) may be pre-generated and stored in the data store 155 for presenting to the user, or it may be generated "on-the-fly" by the controller 160. The calibration module 165 may generate EEG signal data based on electrical signals captured by the in-ear electrodes 104 and received from the IED 130. Alternately, the EEG signal data may be generated by the controller 112 of the IED 130 and the data may be received by the calibration module 165 for storage in the data store 155 and further analysis.

The signal processing module 166 may be configured to perform preprocessing on the generated or received EEG signal. For example, the EEG data may undergo online preprocessing to "clean the data" and remove any noise to isolate true neural data. In some embodiments, where the calibration module 165 generates the EEG signal data, the signal processing module 166 may preprocess the electrical signals captured by the in-ear electrodes 104 and received by the calibration module 165 from the IED 130 and generate the EEG signal data from the preprocessed electrical signals to mitigate and/or separate noise from true neural data.

The calibration module 165 may then analyze the cleaned EEG signal data to determine a quality of the EEG signal data, and perform actions based on the quality determination analysis. In some embodiments, to determine the quality of the signal data, the calibration module 165 may include tools to generate brain activity signatures from the cleaned EEG signal data and identify robust amplitude and timing information of the data over time. The calibration module 165 may then compare the generated brain activity signatures showing amplitude and timing information with predetermined threshold brain activity signatures to determine whether features like amplitude and timing of the EEG signal data indicate that the neural response of the user time-locked to the audible stimulus is as expected. For example, the calibration module 165 may be configured to determine the signal quality by determining whether the (averaged) EEG signal data shows predetermined amplitude suppression at ~50 ms after onset of the click stimulus embedded within the music. Thus, if the captured electrical signals are weaker in one IED 130 than the other IED 130 and/or weaker than a threshold value, it may indicate that one or both of IEDs 130 are not seated well within the ear canal, and controller 160 may prompt (e.g., via speaker or display device of the system) the user accordingly. As another example, if the captured electrical signals are delayed in one IED 130 than the other IED 130 and/or delayed for longer than a threshold value, it may indicate that one or both of IEDs 130 are not seated well within the ear canal, and controller 160 may prompt (e.g., via speaker or display device of the system) the user accordingly. Calibration module 165 may thus validate operation and positioning of IED 130 within the ear canal using the captured electrical signals.

The calibration module 165 may further be configured to perform different actions based on the quality determination or analysis. In some embodiments, the calibration module 165 may include an automated (artificial intelligence or machine learning-based) classifier to determine whether the generated EEG signal data indicates that the time-locked neural response of the user to the stimulus is as expected or not. For example, if the EEG signal does not show a weaker amplitude suppression than a threshold amplitude suppression, and it does not show a delayed response that is longer than a threshold response delay following onset of the (clicky) stimulus embedded within the music, the calibration module 165 may determine that the in-ear electrode 104 is in good contact with the inner surface of the ear canal 118 of the user. In this case, the calibration module 165 may further determine that the generated EEG signal data is true neural data that accurately represents brain activity of the user in response to the stimulus (e.g., impedance and/or signal-to-noise ratio of electrical signals from the in-ear electrodes meets a minimum threshold level). The Calibration module 165 may further be configured to present a notification to the user to this effect (e.g., instruct the speaker 102 or a display device to notify the user of the good fit of IED in the ear canal 118).

On the other hand, if the EEG signal shows a weaker amplitude suppression than the threshold amplitude suppression, shows a delayed response that is longer than the threshold response delay following onset of the click stimulus embedded within the music, or shows both, the calibration module 165 may cause the pitch discrimination module 180 to perform a pitch discrimination operation. To disambiguate hearing impairment of the user from electrode functionality or an instance of the in-ear electrodes 104 not being in good contact with the inner surface of the ear canal 118, the controller 160 may instruct the pitch discrimination module 180 to conduct a pitch discrimination task to test the hearing ability of the user. For example, the pitch discrimination module 180 may control to output a predetermined audio signal from the speaker of the TED 130 while changing a pitch of the audio (e.g., change the pitch to frequencies higher than 4000 Hz), and prompt the user to make a selection (e.g., pitch up or down) to determine whether the user can distinguish between audio at different pitches. Thus, since a user with hearing loss may not be able to solve this task correctly, the calibration device 150 can accurately disambiguate an instance of hearing loss from an instance of the IED 130 not seated well in the ear canal 118 (or electrode malfunction).

If the user is able to successfully complete the pitch discrimination task conducted by the pitch discrimination module 180, the calibration module 165 may determine that the delayed response, weaker response, or both, is due to the IED 130 not seated well in the ear canal 118 (or electrode malfunction). The calibration module 165 may be further configured to present a notification to the user to this effect (e.g., instruct the speaker 102 or a display device to notify the user to readjust or reposition the IED 130 in ear canal 118, to achieve better fit and contact of the in-ear electrodes 104 with inner surface of the ear canal 118, instruct the speaker 102 to notify the user to replace the IED 130 due to electrode malfunction, or both).

If the user is unable to successfully complete the pitch discrimination task conducted by the pitch discrimination module 180, the calibration module 165 may determine that the weaker/delayed response is due to a hearing impairment. The calibration module 165 may further be configured to present a notification to the user to this effect (e.g., instruct the speaker 102 or a display device to notify the user of the impairment). And in this case, the calibration module 165 may further be configured to operate the signal processing module 166 to compensate for the hearing loss of the user by performing signal processing to correct (e.g., amplify) the gain at a predetermined frequency so that audio presented to the user (with hearing loss) from the speaker 102 is adjusted for the user. For example, audio content may selectively be presented to the user and signals from the in-ear electrodes may be monitored to determine an audio profile (e.g., measurement of how well the user hears sound as a function of frequency) for the user. The audio profile for the user may then be used to shape audio content for the user.

Some or all components of the calibration device 150 may be located in the IED 130. That is, some or all the functionality of the calibration device 150, may be performed by the IED 130. That is, the controller 160 may be an embodiment of the controller 112.

In some embodiments, the calibration device 150 is a server connected to the IED 130 via the network 170 that includes the Internet. The network 170 may include any combination of local area and/or wide area networks, using wired and/or wireless communication systems. In one embodiment, the network 170 uses standard communications technologies and/or protocols. For example, the network 170 includes communication links using technologies such as Ethernet, 802.11 (WiFi), worldwide interoperability for microwave access (WiMAX), 3G, 4G, 5G, code division multiple access (CDMA), digital subscriber line (DSL), BLUETOOTH, Near Field Communication (NFC), Universal Serial Bus (USB), or any combination of protocols. In some embodiments, all or some of the communication links of network 170 may be encrypted using any suitable technique or techniques.

Figure 2A:
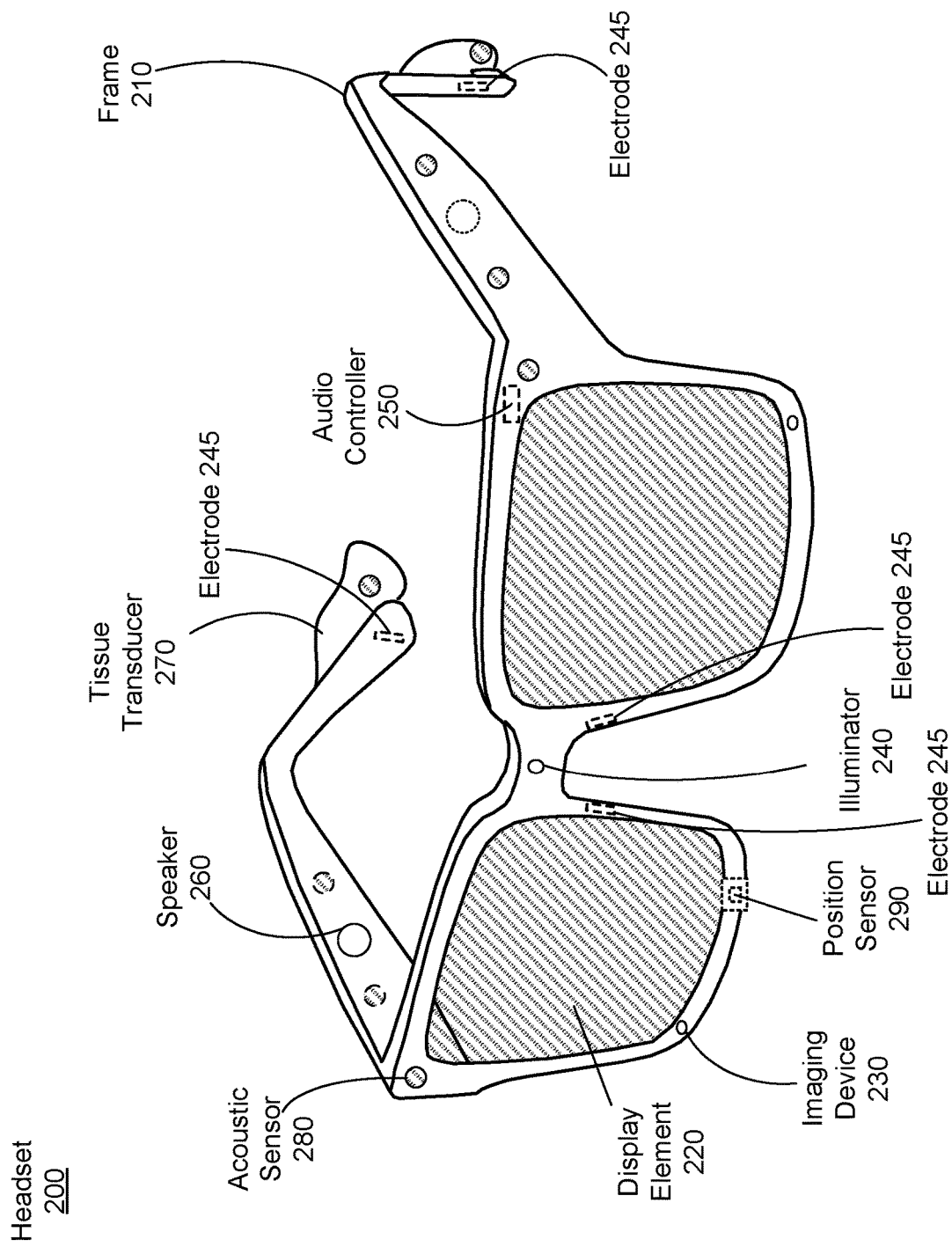
FIG. 2A is a perspective view of a headset implemented as an eyewear device, in accordance with one or more embodiments.

FIG. 2A is a perspective view of a headset 200 implemented as an eyewear device, in accordance with one or more embodiments. The headset 200 is an example of the calibration device 150. In some embodiments, the eyewear device is a near eye display (NED). In general, the headset 200 may be worn on the face of a user such that content (e.g., media content) is presented using a display assembly and/or an audio system. However, the headset 200 may also be used such that media content is presented to a user in a different manner. Examples of media content presented by the headset 200 include one or more images, video, audio, or some combination thereof. The headset 200 includes a frame, and may include, among other components, a display assembly including one or more display elements 220 (e.g., notification unit), a depth camera assembly (DCA), an audio system, and a position sensor 290. While FIG. 2A illustrates the components of the headset 200 in example locations on the headset 200, the components may be located elsewhere on the headset 200, on a peripheral device paired with the headset 200 (e.g., on IED 130), or some combination thereof. Similarly, there may be more or fewer components on the headset 200 than what is shown in FIG. 2A.

A frame 210 holds the other components of the headset 200. The frame 210 includes a front part that holds the one or more display elements 220 and end pieces (e.g., temples) to attach to a head of the user. The front part of the frame 210 bridges the top of a nose of the user. The length of the end pieces may be adjustable (e.g., adjustable temple length) to fit different users. The end pieces may also include a portion that curls behind the ear of the user (e.g., temple tip, earpiece).

As shown in FIG. 2A, the frame 210 may include one or more electrodes 245. The embodiment shown in FIG. 2A illustrates two electrodes 245 in the nosepads of the frame 210 and two electrodes 245 on the temple tips. However, this is not intended to be limiting. Other embodiments of the headset 200 may have fewer or more electrodes 245 that may be disposed at locations other than or in addition to the nosepads and temple tips of the frame 210. Each electrode 245 may be mounted so as to be configured to be in contact with the anatomy (e.g., nose bridge, back of ear) of the user when the headset 200 is worn by the user. Like the in-ear electrodes 104, each electrode 245 may be configured to capture electrical charges that result from activity in brain cells in response to stimulus (e.g., neural response). In some embodiments, the headset 200 may be configured to generate the EEG signal data based on electrical signals captured by one or more of electrodes 245, as well as based on the electrical signals that are captured by the in-ear electrodes 104. The electrodes 245 may be positioned anywhere on the frame 210 so long as they contact the tissue of the user to be able to capture the electrical signals representing the brain activity of the user time-locked in response to audible stimulus. Other aspects of the electrodes 245 may be similar to those of the in-ear electrodes 104. In some embodiments, the electrodes 245 may replace the in-ear electrodes 104 to capture the electrical signals for generating the EEG signal.

The one or more display elements 220 provide light to a user wearing the headset 200. As illustrated, the headset 200 includes the display element 220 for each eye of a user. In some embodiments, the display element 220 generates image light that is provided to an eyebox of the headset 200. The eyebox is a location in space that an eye of user occupies while wearing the headset 200. For example, the display element 220 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 220 are opaque and do not transmit light from a local area around the headset 200. The local area is the area surrounding the headset 200. For example, the local area may be a room that a user wearing the headset 200 is inside, or the user wearing the headset 200 may be outside and the local area is an outside area. In this context, the headset 200 generates VR content. Alternatively, in some embodiments, one or both of the display elements 220 are at least partially transparent, such that light from the local area may be combined with light from the one or more display elements to produce AR and/or MR content.

In some embodiments, the display element 220 does not generate image light, and instead is a lens that transmits light from the local area to the eyebox. For example, one or both of the display elements 220 may be a lens without correction (non-prescription) or a prescription lens (e.g., single vision, bifocal and trifocal, or progressive) to help correct for defects in a user's eyesight. In some embodiments, the display element 220 may be polarized and/or tinted to protect the user's eyes from the sun. In some embodiments, the display element 220 may include an additional optics block (not shown). The optics block may include one or more optical elements (e.g., lens, Fresnel lens, etc.) that direct light from display element 220 to the eyebox. The optics block may, e.g., correct for aberrations in some or all of the image content, magnify some or all of the image, or some combination thereof.

The DCA determines depth information for a portion of a local area surrounding the headset 200. The DCA includes one or more imaging devices 230 and a DCA controller (not shown in FIG. 2A), and may also include an illuminator 240. In some embodiments, the illuminator 240 illuminates a portion of the local area with light. The light may be, e.g., structured light (e.g., dot pattern, bars, etc.) in the infrared (IR), IR flash for time-of-flight, etc. In some embodiments, the one or more imaging devices 230 capture images of the portion of the local area that include the light from the illuminator 240. As illustrated, FIG. 2A shows a single illuminator 240 and two imaging devices 230. In alternate embodiments, there is no illuminator 240 and at least two imaging devices 230. The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 240), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 200 may prompt the user to opt in to allow operation of the eye tracking unit. For example, by opting in the headset 200 may detect, store, images of the user's eye or eye tracking information of the user.

In some embodiments, although not shown in FIG. 2A, the headset 200 may include one or more electrooculography (EOG) electrodes that are positioned close to the eyes of the user and that are configured to measure electrical signals representing the corneo-retinal standing potential that exists between the front and the back of one or both eyes of the user, to generate EOG signal data. The EOG signal data correlates in time with gaze direction of the user's eyes. The eye tracking unit may further be configured to determine the eye tracking information based on the generated EOG signal data using the EOG electrodes. In some embodiments, the eye tracking information, along with the EEG signal data corresponding to the in-ear electrodes 104 and/or the electrodes 245 may together be used to, e.g., determine whether a user is paying attention to a particular sound source. Based on the determination, an audio system of the headset 200 may selectively emphasize sound (e.g., beamforming) from the identified sound source relative to other sound in the local area.

The audio system provides audio content. The audio system includes a transducer array, a sensor array, and an audio controller 250. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 260 or a tissue transducer 270 (e.g., a bone conduction transducer or a cartilage conduction transducer). Although the speakers 260 are shown exterior to the frame 210, the speakers 260 may be enclosed in the frame 210. In some embodiments, instead of individual speakers for each ear, the headset 200 includes a speaker array comprising multiple speakers integrated into the frame 210 to improve directionality of presented audio content. The tissue transducer 270 couples to the head of the user and directly vibrates tissue (e.g., bone or cartilage) of the user to generate sound. The number and/or locations of transducers may be different from what is shown in FIG. 2A. In some embodiments, the transducer is in the IED 130, such as the audio transducer 102.

The sensor array detects sounds within the local area of the headset 200. The sensor array includes a plurality of acoustic sensors 280. An acoustic sensor 280 captures sounds emitted from one or more sound sources in the local area (e.g., a room). Each acoustic sensor is configured to detect sound and convert the detected sound into an electronic format (analog or digital). The acoustic sensors 280 may be acoustic wave sensors, microphones, sound transducers, or similar sensors that are suitable for detecting sounds. In some embodiments, the acoustic sensor 124 and the acoustic sensor 108 are substantially the same as the acoustic sensor 280, except that the acoustic sensors 108, 124 are integrated into an IED and the acoustic sensor 280 is integrated into the headset 200.

In some embodiments, one or more acoustic sensors may be placed in an ear canal of each ear (e.g., in the IED 130, acting as binaural microphones). In some embodiments, the acoustic sensors 280 may be placed on an exterior surface of the headset 200, placed on an interior surface of the headset 200, separate from the headset 200 (e.g., part of some other device), or some combination thereof. The number and/or locations of the acoustic sensors 280 may be different from what is shown in FIG. 2A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 200.

The audio controller 250 processes information from the sensor array that describes sounds detected by the sensor array. The audio controller 250 may comprise a processor and a computer-readable storage medium. The audio controller 250 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 260, or some combination thereof. In some embodiments, the audio controller 250 may subsume some or all of the functionality provided by the controller 160 of the calibration device 150, and/or by the controller 112 of the IED 130. The audio controller 250 may thus be configured to perform the real-time in-ear EEG signal verification operation. In some embodiments, some or all of the functionality of the audio controller 250 may be provided by the controller 112 of the IED 130.

The position sensor 290 generates one or more measurement signals in response to motion of the headset 200. The position sensor 290 may be located on a portion of the frame 210 of the headset 200. The position sensor 290 may include an inertial measurement unit (IMU). Examples of the position sensor 290 include: one or more accelerometers, one or more gyroscopes, one or more magnetometers, another suitable type of sensor that detects motion, a type of sensor used for error correction of the IMU, or some combination thereof. The position sensor 290 may be located external to the IMU, internal to the IMU, or some combination thereof.

In some embodiments, the headset 200 may provide for simultaneous localization and mapping (SLAM) for a position of the headset 200 and updating of a model of the local area. For example, the headset 200 may include a passive camera assembly (PCA) that generates color image data. The PCA may include one or more RGB cameras that capture images of some or all of the local area. In some embodiments, some or all of the imaging devices 230 of the DCA may also function as the PCA. The images captured by the PCA and the depth information determined by the DCA may be used to determine parameters of the local area, generate a model of the local area, update a model of the local area, or some combination thereof. Furthermore, the position sensor 290 tracks the position (e.g., location and pose) of the headset 200 within the room.

Figure 2B:
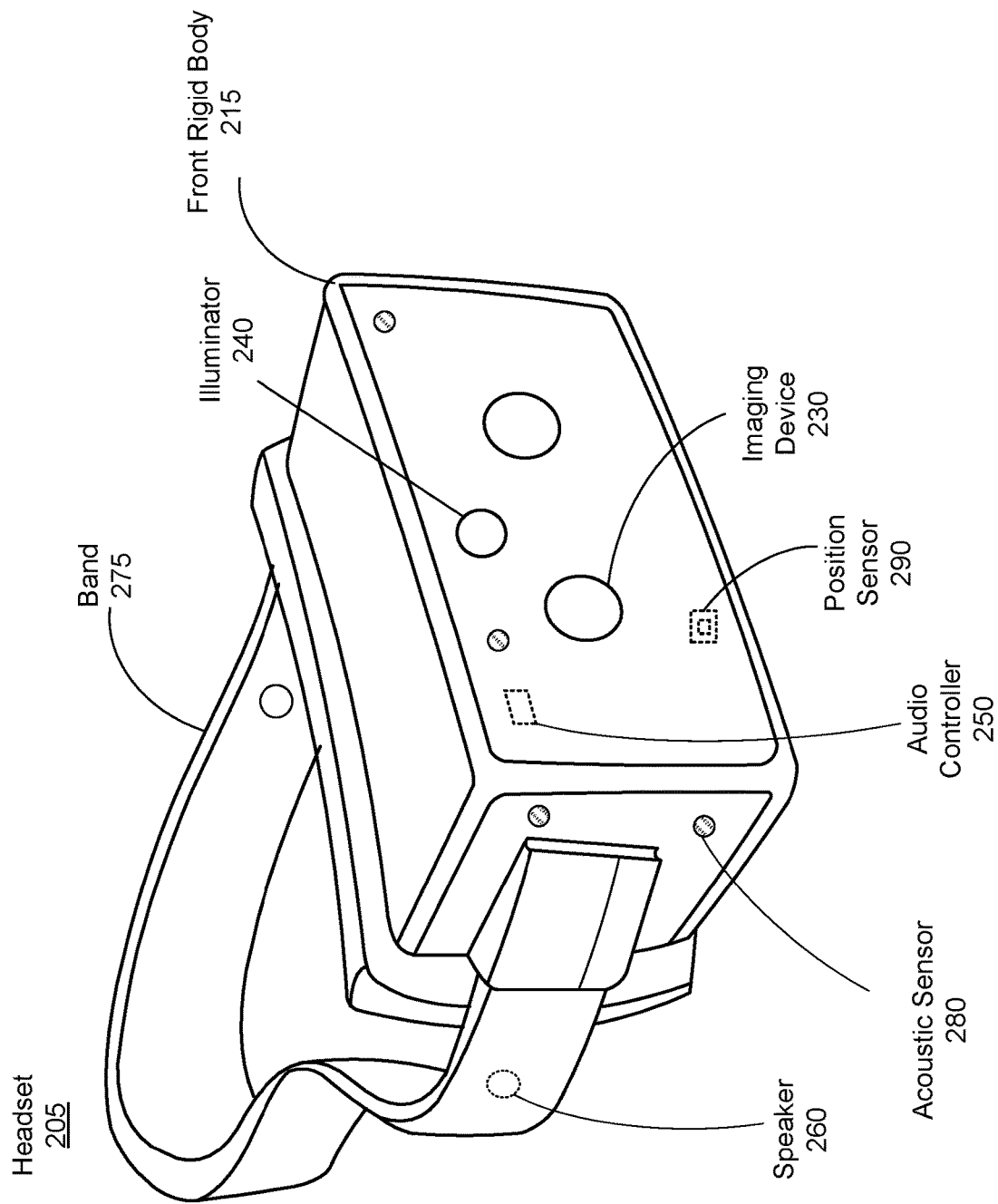
FIG. 2B is a perspective view of a headset implemented as a head-mounted display, in accordance with one or more embodiments.

FIG. 2B is a perspective view of a headset 205 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 215 and a band 275. The headset 205 includes many of the same components described above with reference to FIG. 2A, but modified to integrate with the HMD form factor. For example, the HMD includes a display assembly, a DCA, an audio system, EEG electrodes, EOG electrodes, and the position sensor 290. FIG. 2B shows the illuminator 240, a plurality of the speakers 260, a plurality of the imaging devices 230, a plurality of the acoustic sensors 280, and the position sensor 290. The speakers 260 may be located in various locations, such as coupled to the band 275 (as shown), coupled to the front rigid body 215, or may be configured to be inserted within the ear canal of a user.

Figure 3:
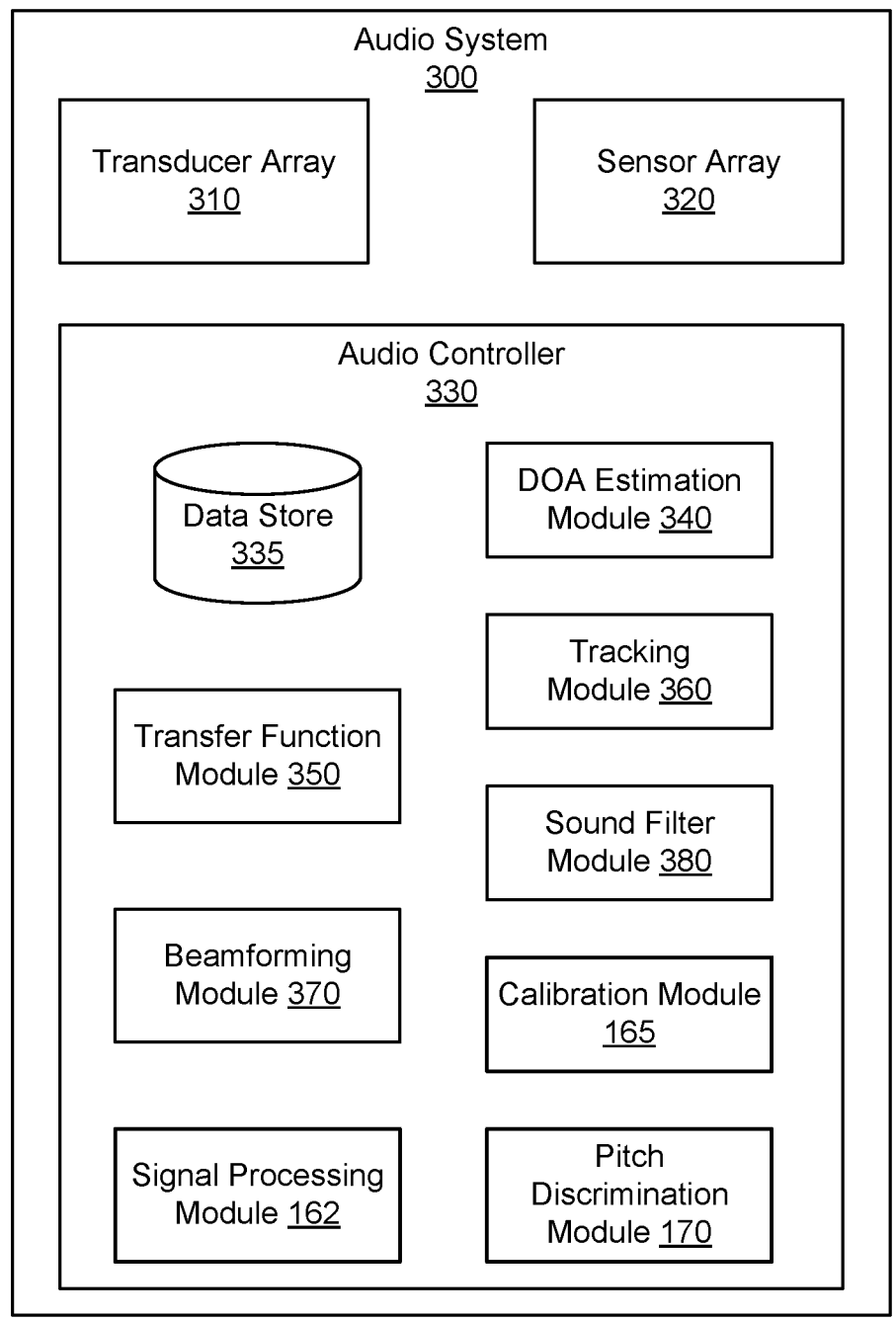
FIG. 3 is a block diagram of an audio system, in accordance with one or more embodiments.

FIG. 3 is a block diagram of an audio system 300, in accordance with one or more embodiments. The audio system 300 may subsume the functionality, in whole or in part, of the controller 160 of the calibration device 150 of FIG. 1, and/or the functionality, in whole or in part, of the controller 112 of the IED 130 of FIG. 1. Further, the audio system in FIG. 2A or FIG. 2B may be an embodiment of the audio system 300. The audio system 300 generates one or more acoustic transfer functions for a user. The audio system 300 may then use the one or more acoustic transfer functions to generate audio content for the user. In the embodiment of FIG. 3, The audio system 300 includes a transducer array 310, a sensor array 320, and an audio controller 330. Some embodiments of the audio system 300 have different components than those described here. Similarly, in some cases, functions can be distributed among the components in a different manner than is described here.

The transducer array 310 is configured to present audio content. The transducer array 310 includes a plurality of transducers. A transducer is a device that provides audio content. A transducer may be, e.g., a speaker (e.g., the speaker 102, the speaker 260), a tissue transducer (e.g., the tissue transducer 270), some other device that provides audio content, or some combination thereof. A tissue transducer may be configured to function as a bone conduction transducer or a cartilage conduction transducer. The transducer array 310 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 310 generates audio content in accordance with instructions from the audio controller 330. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 300. The transducer array 310 may be coupled to a wearable device (e.g., the IED 130, the headset 200 or the headset 205). In alternate embodiments, transducer array 310 may be a plurality of speakers that are separate from the wearable device (e.g., coupled to an external console).

The sensor array 320 detects sounds within a local area surrounding the sensor array 320. The sensor array 320 may include a plurality of acoustic sensors (e.g., the sensors 108, 124, and/or 280) that each detect air pressure variations of a sound wave and convert the detected sounds into an electronic format (analog or digital). The plurality of acoustic sensors may be positioned on a headset (e.g., the headset 200, and/or the headset 205), on a user (e.g., the IED 130 in an ear canal of the user), on a neckband, or some combination thereof. An acoustic sensor may be, e.g., a microphone, a vibration sensor, an accelerometer, or any combination thereof. In some embodiments, the sensor array 320 is configured to monitor the audio content generated by the transducer array 310 using at least some of the plurality of acoustic sensors. Increasing the number of sensors may improve the accuracy of information (e.g., directionality) describing a sound field produced by the transducer array 310 and/or sound from the local area.

The audio controller 330 controls operation of the audio system 300. In the embodiment of FIG. 3, the audio controller 230 includes a data store 335, a DOA estimation module 340, a transfer function module 350, a tracking module 360, a beamforming module 370, a sound filter module 380. In an embodiment where the controller 330 subsumes functionality of the calibration device 150, the audio controller 350 may further include the calibration module 165, the signal processing module 166, and the pitch discrimination module 180, and the data store 335 may store data corresponding the data store 155. Detailed description of components and features of the audio controller 330 that are already discussed above in connection with FIGS. 1, 2A, and 2B are omitted here to avoid repetition. The audio controller 330 may be located inside a headset, and/or the IED 130 in some embodiments. Some embodiments of the audio controller 330 have different components than those described here. Similarly, functions can be distributed among the components in different manners than described here. For example, some functions of the controller may be performed external to the headset. The user may opt in to allow the audio controller 330 to transmit data captured by the headset to systems external to the headset, and the user may select privacy settings controlling access to any such data.

The data store 335 stores data for use by the audio system 300. Data in the data store 335 may include sounds recorded in the local area of the audio system 300, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 300, or any combination thereof. Data in the data store 335 may also include data that is stored in the data store 155 and that is related to the real-time in-ear EEG signal verification operation. For example, the data may include audio data of one or more calibration audio signals that are embedded with predetermined audible features (e.g., clicks), data for conducting the pitch discrimination test by the pitch discrimination module 180, data for conducting the calibration operation (e.g., program instructions for generating EEG data from electric signals captured by electrodes, program instructions for preprocessing the electrical signals and/or the EEG data, program instructions for analyzing the EEG data (e.g., via an automated classifier), threshold signature neural data (e.g., threshold amplitude condition, threshold time condition), program instructions for performing different actions based on the analysis, and notification data for notifying the user of the determined action).

The DOA estimation module 340 is configured to localize sound sources in the local area based in part on information from the sensor array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 300 is located.

For example, the DOA analysis may be designed to receive input signals from the sensor array 320 (or from sensors or electrodes in the IED 130, the headset 200, or the headset 205) and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 (or of the IED 130, or the headset 200 or 205) within the local area. The position of the sensor array 320 may be received from an external system (e.g., some other component of a headset, an artificial reality console, a mapping server, a position sensor (e.g., the position sensor 290), etc.). The external system may create a virtual model of the local area, in which the local area and the position of the audio system 300 are mapped. The received position information may include a location and/or an orientation of some or all of the audio system 300 (e.g., of the sensor array 320). The DOA estimation module 340 may update the estimated DOA based on the received position information.

The Transfer function module 350 is configured to generate one or more acoustic transfer functions. Generally, a transfer function is a mathematical function giving a corresponding output value for each possible input value. Based on parameters of the detected sounds, the transfer function module 350 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the sensor array 320 may differ from user to user due to a person's anatomy (e.g., ear shape, shoulders, etc.) that affects the sound as it travels to the person's ears. Accordingly, the ATFs of the sensor array 320 are personalized for each user of the audio system 300.

In some embodiments, the transfer function module 350 determines one or more HRTFs for a user of the audio system 300. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 350 may determine HRTFs for the user using a calibration process. In some embodiments, the transfer function module 350 may provide information about the user to a remote system. The user may adjust privacy settings to allow or prevent the transfer function module 350 from providing the information about the user to any remote systems. The remote system determines a set of HRTFs that are customized to the user using, e.g., machine learning, and provides the customized set of HRTFs to the audio system 300.

The tracking module 360 is configured to track locations of one or more sound sources. The tracking module 360 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to process one or more ATFs to selectively emphasize sounds from sound sources within a certain area while de-emphasizing sounds from other areas. In analyzing sounds detected by the sensor array 320, the beamforming module 370 may combine information from different acoustic sensors to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360, eye tracking information from the eye tracking unit, the (calibrated and verified) real-time EEG signal data, and EOG signal data. In some embodiments, the beamforming module 370 may isolate an audio signal associated with sound from a particular sound source based on the eye tracking information generated by the eye tracking unit of the headset 200 of FIG. 2, and/or based on the EEG signal data corresponding to the in-ear electrodes 104 and/or the electrodes 245 and/or the EOG electrodes of the headset 200. The beamforming module 370 may thus selectively analyze discrete sound sources in the local area. In some embodiments, the beamforming module 370 may enhance a signal from a sound source. For example, the beamforming module 370 may apply sound filters which eliminate signals above, below, or between certain frequencies. Signal enhancement acts to enhance sounds associated with a given identified sound source relative to other sounds detected by the sensor array 320.

The sound filter module 380 determines sound filters for the transducer array 310. In some embodiments, the sound filters cause the audio content to be spatialized, such that the audio content appears to originate from a target region. The sound filter module 380 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 380 calculates one or more of the acoustic parameters. In some embodiments, the sound filter module 380 requests the acoustic parameters from a mapping server. The sound filter module 380 provides the sound filters to the transducer array 310 (or to the speakers of the IED 130, the headset 200, or the headset 205). In some embodiments, the sound filters may cause positive or negative amplification of sounds as a function of frequency.

FIG. 4 is a flowchart of method 400 for calibrating neural signal data, in accordance with one or more embodiments. The process shown in FIG. 4 may be performed by components of the EEG calibration system 100 (e.g., the calibration device 150). Other entities (e.g., the controller 112, the audio controller 250, the audio system 300) may perform some or all of the steps in FIG. 4 in other embodiments. Embodiments may include different and/or additional steps, or perform the steps in different orders.

The EEG calibration system 100 determines 410 that an in-ear device is worn by a user by placing the IED in an ear canal of the user. For example, based on sensor data from one or more sensors (e.g., the motion sensor 110 of the IED 130), the controller 160 may determine that the in-ear device is worn by the user by placing the IED in an ear canal of the user. The calibration device 150 may be configured to perform the steps of method 400 to perform the calibration operation every time the IED is worn by the user by placing the IED in the ear canal, or every time the IED is otherwise determined to be powered on by the user (e.g., as part of a startup sequence or boot process). Alternately, or in addition, the calibration device 150 may be configured to perform the steps of method 400 to perform the calibration operation in response to a user operation (e.g., the user making a predetermined operation, e.g., in an app on a smartphone). Alternately, or in addition, the calibration operation may be performed automatically when the calibration device 150 determines that it has become necessary to perform the calibration operation (e.g., because the user has started using a particular feature of the headset or wearable device that requires accurate EEG data).

The EEG calibration system 100 presents 420 a calibration audio signal to the user via a speaker of an IED. For example, the calibration device 150 (or the controller 112) may control, e.g., the speaker 102 of the IED 130, to present a calibration audio signal to the user. In one embodiment, the calibration audio signal may a snippet of music that has been embedded with a predetermined audible feature (e.g., a plurality of clicks or chirps or true tones that are known to evoke neural responses in the user as an auditory evoked potential time-locked to the presentation of stimuli). In some embodiments, the calibration audio signal may be pre-generated and stored in a data store (e.g., the data store 155 of the calibration device 150). The calibration audio signal may be one among a plurality of pre-generated and stored calibration audio signals, each being embedded with same or different predetermined audible features, and the EEG calibration system 100 may present 420 one or more of the stored calibration audio signals for the calibration operation based on predetermined settings (e.g., based on user preference or setting). In other embodiments, the calibration audio signal may be customized and generated dynamically (e.g., by the calibration device 150 or by the controller 112 of the IED 130) based on user data by synthesizing audio content (e.g., a recently played audio track, an audio track set as a favorite, other audio or sound content or tune selectively set by the user) with the predetermined audible feature (e.g., chirps, clicks, true tones, and the like) and presented to the user of the IED. For example, a click or a tone (like a metronome playing) can be overlaid on top of a song, where most of the tones/clicks can be of a specific frequency, but other tones could be a different frequency. The number of clicks may depend on how long the musical excerpt would be (e.g., 1 minute) and the number of beats per phrase the musical excerpt has (e.g., 3 beats, 4 beats, etc.)

The EEG calibration system 100 (e.g., the calibration device 150, the controller 112) generates 430 neural signal data based on electrical signals captured from one or more electrodes (e.g., the electrodes 104, 245). For example, based on electrical signals captured by the in-ear electrodes 104, the neural signal data (e.g., EEG signal data) may be generated (e.g., estimated) by the controller 112, and/or by the controller 160 of the calibration device 150. In case the neural signal data is generated by the controller 160, the electrical signals captured by the electrodes 104 of the IED 130 may be converted to digital data by the ADC of the controller 112, and the digital data may be transmitted to the controller 160 of the calibration device 150 via the network 170 for generation of the neural signal data. The neural signal data may define a waveform over time that represents the electrical activity that is taking place within the brain of the user at a predetermined time after the onset of a stimulus, e.g., click stimulus embedded within music. The EEG calibration system 100 may also preprocess the generated neural signal data (or electrical signals used to generate the EEG signal data) to "clean the data" and remove any noise from true neural signal data. The EEG calibration system 100 may generate the neural signal data by presenting the calibration audio signal (e.g., clicky music) to the user for a predetermined period of time (e.g., ~30 seconds). And while the audio content is being presented, capturing the electrical signals with the in-ear electrodes representing the time-locked neural response of the user to, e.g., the clicks present in the audio content, and using the electrical signals captured for the predetermined period of time to generate the EEG signal representing the brain activity of the user over the predetermined period of time.

The EEG calibration system 100 may analyze 440 the generated (cleaned) neural signal data. For example, the calibration module 165 may generate brain activity signatures from the cleaned EEG signal data and identify robust amplitude and timing information. The calibration module 165 may then compare the generated brain activity signatures showing amplitude and timing information with predetermined threshold signatures to determine whether features like amplitude and timing of the EEG signal data over time indicate that the time-locked neural response of the user to stimuli is as expected. For example, the calibration module 165 may be configured to determine whether the EEG signal data shows amplitude suppression at ~50 ms after onset of the click stimulus embedded within the music. The calibration module 165 may be configured to make the determination by, e.g., averaging the response for a plurality of stimuli (e.g., for a plurality of clicks) embedded in the calibration audio signal presented to the user for a predetermined period of time.

The calibration module 165 may perform 450 an action based on the analysis 440 of the neural signal data. Actions performed at block 450 based on analysis 440 of the neural signal data are explained in further detail below in connection with FIG. 5.

Figure 5:
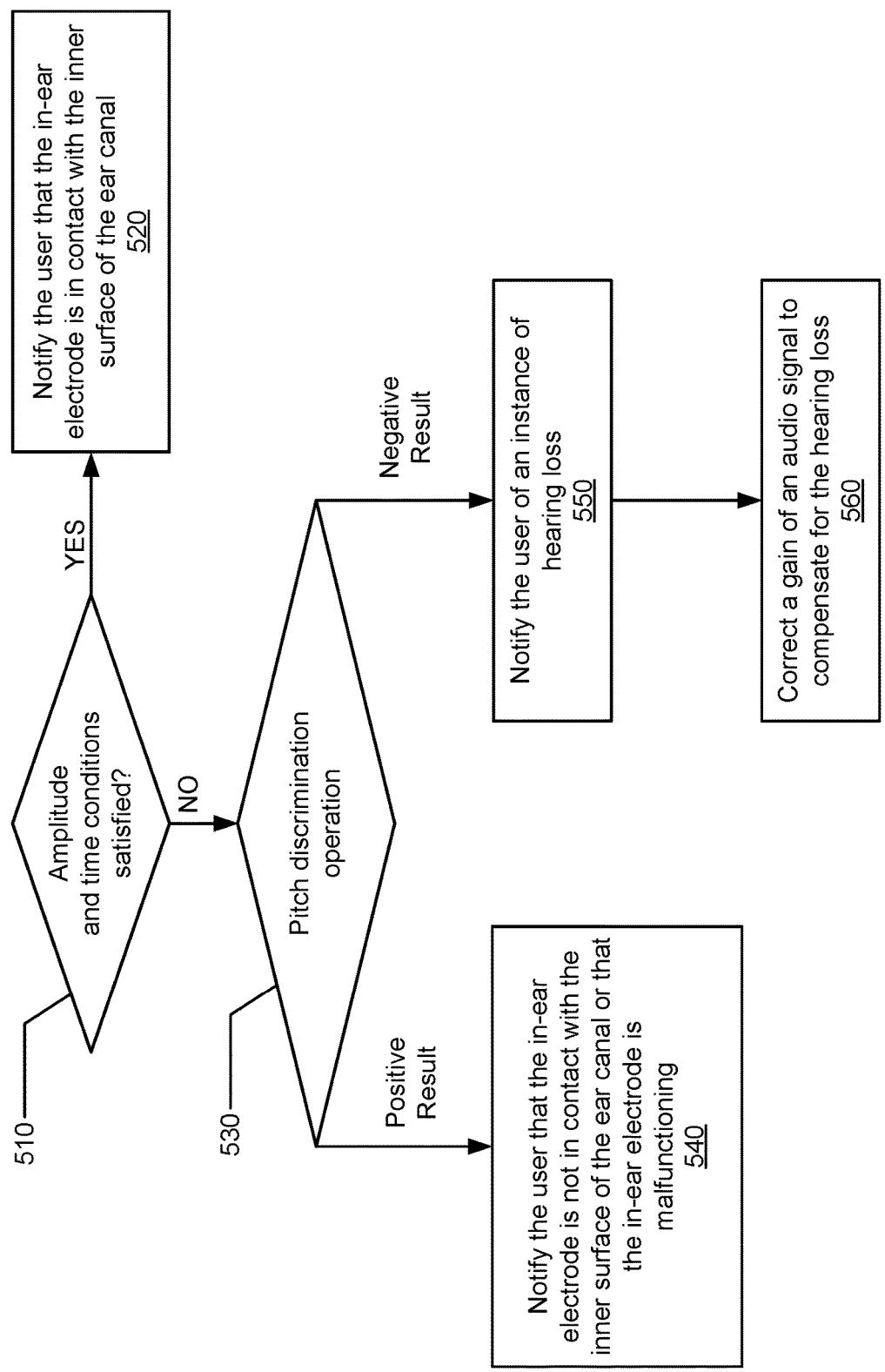
FIG. 5 is a flowchart of a method for determining different actions to be performed based on an analysis of the neural signal data, in accordance with one or more embodiments.

FIG. 5 is a flowchart of method 500 for determining different actions to be performed based on the determined quality of the neural signal data, in accordance with one or more embodiments. The process shown in FIG. 5 may be performed by components of EEG calibration system 100 (e.g., calibration device 150). Other entities (e.g., controller 112 of IED 130, audio controller 250, audio system 300) may perform some or all of the steps in FIG. 5 in other embodiments. Embodiments may include different and/or additional steps, or perform the steps in different orders.

The calibration module 165 determines 510 whether the neural signal data generated and filtered at block 430 of FIG. 4, and analyzed at block 440 of FIG. 4 meets predetermined amplitude and time conditions. For example, the calibration module 165 determines 510 whether the EEG data shows amplitude suppression at ~50 ms after onset of stimulus embedded within the calibration audio signal. That is, the calibration module 165 may measure EEG responses to repeated pairs of 50 millisecond auditory clicks separated by ~500 milliseconds. And in this example, the calibration module 165 may determine 510 whether there is suppression of the second click (as this is the redundant stimuli). That is, the calibration module 165 may determine 510 whether there is a threshold amplitude difference between the P50 peak for the first click stimuli and the P50 click in the second click.

In response to determining that the neural signal meets the predetermined amplitude and time conditions (YES at block 510), the calibration module 165 determines that the in-ear electrode 104 is in good contact with the inner surface of the ear canal 118 of the user and that the generated EEG signal data is true neural data that accurately represents brain activity of the user time-locked in response to stimulus in real-time. The calibration module may present a notification to the user to this effect (e.g., display a notification on the display element 220, instruct the speaker 102 to notify the user of the good fit of IED in the ear canal 118, and the like).

On the other hand, in response to determining that the neural signal data does not meet the predetermined amplitude or time conditions (NO at block 510), the calibration module determines 530 whether the delayed brainstem response, weaker brainstem response, or both, to stimuli is consistent with hearing impairment by conducting a pitch discrimination operation to test hearing of the user. To disambiguate hearing loss from electrode functionality or an instance of the in-ear electrodes 104 of the IED 130 not being fitted correctly in the ear canal 118, the calibration module may invoke the pitch discrimination module 180 to conduct a pitch discrimination task to test the hearing ability of the user.

The pitch discrimination task conducted by the pitch discrimination module 180 may lead to one of a positive result and a negative result. A positive result occurs if the pitch discrimination module 180 determines that the user is able to distinguish between pitches of the audio content presented to the user during the pitch discrimination task. A negative result occurs if the pitch discrimination module 180 determines that the user is not able to distinguish between pitches of the audio content present to the user during the pitch discrimination task. In case of the positive result, the calibration module determines 540 that the delayed response, weaker response, or both, (i.e., amplitude and/or time condition not satisfied at block 510) is due to the IED 130 not seated well in the ear canal 118 (or electrode malfunction; e.g., electrodes not in good contact with the inner surface of ear canal, electrodes not inserted far or deep enough in ear canal, electrode needs to be replaced, and the like). The calibration module 165 may also determine whether the IED 130 is not seated well in the ear canal 118 by analyzing an EEG signal signature of the IED 130. That is, the EEG signal signature of the IED 130 not seated well in the ear canal 118 may be a flat line in the neural response or excessively noisy (where the noise would look like uninterpretable frequent oscillations or unpatterned "ups" and "downs" in the neural data). And the calibration module 165 may make the determination regarding the IED 130 not seated well based on the EEG signal signature. The calibration module 165 may further be configured to present a notification to the user to this effect (e.g., display a notification on the display element 220 prompting the user to readjust positioning of IED in ear canal or to replace the IED, control the speaker 102 to prompt the user to readjust positioning of the IED in ear canal or to replace the IED, and the like).

In case of the negative result, the calibration module 165 determines that the delayed response, weaker response, or both (i.e., amplitude and/or time condition not satisfied at block 510) is due to a hearing impairment of the user. The calibration module 165 may be further configured to present a notification 550 to the user to this effect (e.g., instruct the speaker 102 or display a notification on the display element 220 to notify the user of the hearing impairment).

The calibration module may further be configured to perform signal processing (e.g., via the signal processing module 166) to compensate for the hearing loss of the user by performing signal processing to correct (e.g., amplify) the gain 560 at a predetermined frequency so that audio presented to the user from speaker 102 is adjusted according to a determined level of hearing impairment of the user.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
    an in-ear device (IED) configured to be placed within an ear canal of a user, the IED comprising:
        a speaker configured to present a calibration audio signal to the user, wherein the calibration audio signal is embedded with a predetermined audible feature; and
        an in-ear electrode configured to be in contact with an inner surface of the ear canal; and
    a controller configured to:
        synthesize the calibration audio signal with the predetermined audible feature, wherein a phase response of the calibration audio signal and the predetermined audible feature is aligned while a magnitude of the calibration audio signal remains consistent;
        instruct the speaker to present the calibration audio signal to the user;
        generate neural signal data based on electrical signals from the in-ear electrode, the electrical signals corresponding to brain activity of the user in response to the predetermined audible feature;
        determine a quality of the generated neural signal data; and
        perform an action based on the quality of the neural signal data.

2. The system of claim 1, wherein the electrical signals are electroencephalography (EEG) signals, and wherein the neural signal data is EEG signal data.

3. The system of claim 2,
    wherein the controller is further configured to:
        determine the quality of the neural signal data by determining whether the neural signal data meets a predetermined amplitude suppression condition and a predetermined time condition following onset of the predetermined audible feature; and
        in response to a determination that the neural signal data meets the predetermined amplitude suppression condition and the predetermined time condition, cause a notification to be presented to the user indicating that the in-ear electrode is in contact with the inner surface of the ear canal.

4. The system of claim 3, wherein the controller is further configured to, in response to a determination that the neural signal data does not meet the predetermined amplitude suppression condition and the predetermined time condition, determine a result of a pitch discrimination operation.

5. The system of claim 4, wherein in response to determining that the result of the pitch discrimination operation is positive, the controller is further configured to cause the notification to be presented to the user indicating that, one of:
    the in-ear electrode is not in contact with the inner surface of the ear canal; or
    the in-ear electrode is malfunctioning.

6. The system of claim 4, wherein in response to a determination that the result of the pitch discrimination operation is negative, the controller is further configured to cause the notification to be presented to the user indicating an instance of hearing loss.

7. The system of claim 6, wherein the controller is further configured to perform signal processing to correct a gain of an audio signal to compensate for the hearing loss.

8. The system of claim 1, wherein the calibration audio signal comprises a snippet of music synthesized with the predetermined audible feature comprising a plurality of clicks.

9. The system of claim 1, further comprising a headset that includes the controller, and the headset further includes at least a second electrode configured to capture second electrical signals corresponding to brain activity of the user in response to the predetermined audible feature,
wherein the controller is configured to generate the neural signal data based on the electrical signals from the in-ear electrode, and the second electrical signals from the second electrode.

10. A method, comprising:
determining that an in-ear device (IED) is worn by a user by placing the IED in an ear canal of the user, wherein the IED comprises a speaker, and an in-ear electrode is configured to be in contact with an inner surface of the ear canal;
synthesizing a calibration audio signal embedded with a predetermined audible feature, wherein a phase response of the calibration audio signal and the predetermined audible feature is aligned while a magnitude of the calibration audio signal remains consistent;
presenting the calibration audio signal to the user with the speaker;
generating electroencephalography (EEG) signal data based on electrical signals from the in-ear electrode, the electrical signals corresponding to brain activity of the user in response to the predetermined audible feature;
analyzing the generated EEG signal data; and
performing an action based on the analysis.

11. The method of claim 10,
wherein analyzing the EEG signal data comprises determining whether the EEG signal data meets a predetermined amplitude suppression condition and a predetermined time condition following onset of the predetermined audible feature, and
wherein the method further comprises notifying the user that the in-ear electrode is in contact with the inner surface of the ear canal in response to determining that the EEG signal data meets the predetermined amplitude suppression condition and the predetermined time condition.

12. The method of claim 11, further comprising determining a result of a pitch discrimination operation in response to determining that the EEG signal data does not meet the predetermined amplitude suppression condition and the predetermined time range.

13. The method of claim 12, further comprising, based on a positive result of the pitch discrimination operation one of:
notifying the user that the in-ear electrode is not in contact with the inner surface of the ear canal; or
notifying the user that the in-ear electrode is malfunctioning.

14. The method of claim 12, further comprising, based on a negative result of the pitch discrimination operation:
notifying the user of an instance of hearing loss; and
correcting a gain of an audio signal to compensate for the hearing loss.

15. The method of claim 10, wherein the calibration audio signal comprises a snippet of music synthesized with the predetermined audible feature comprising of a plurality of clicks.

16. The method of claim 10, wherein the EEG signal data is generated based on the electrical signals from the in-ear electrode, and further based on second electrical signals that correspond to brain activity of the user which is time-locked to and in response to the predetermined audible feature, and that are captured by a second electrode included in a headset wearable by the user.

17. A non-transitory computer readable medium having a computer-executable program stored thereon, the program comprising instructions that, when executed by one or more processors, cause the one or more processors to:
determine that an in-ear device (IED) is worn by a user by placing the IED in an ear canal of the user, wherein the IED comprises a speaker, and an in-ear electrode configured to be in contact with an inner surface of the ear canal;
synthesize a calibration audio signal embedded with a predetermined audible feature, wherein a phase response of the calibration audio signal and the predetermined audible feature is aligned while a magnitude of the calibration audio signal remains consistent;
control the speaker to present a calibration audio signal to the user;
generate neural signal data based on electrical signals from the in-ear electrode, the electrical signals corresponding to brain activity of the user in response to the predetermined audible feature;
determine a quality of the neural signal data; and
perform an action based on the determined quality of the neural signal data.

18. The non-transitory computer-readable medium of claim 17,
wherein the instructions that cause the one or more processors to determine the quality of the neural signal data comprise instructions that, when executed by the one or more processors, cause the one or more processors to determine whether the neural signal data meets a predetermined amplitude suppression condition and a predetermined time condition following onset of the predetermined audible feature, and
wherein the program further comprises instructions that, when executed by one or more processors, cause the one or more processors to present a notification to the user that the in-ear electrode is in contact with the inner surface of the ear canal in response to determining that the neural signal data meets the predetermined conditions.

19. The non-transitory computer-readable medium of claim 17, wherein the calibration audio signal comprises a snippet of music synthesized with the predetermined audible feature comprising of a plurality of clicks.

20. The non-transitory computer-readable medium of claim 17, wherein the instructions that cause the one or more processors to generate the neural signal data comprise instructions that, when executed by the one or more processors, cause the one or more processors to generate the neural signal data based on the electrical signals from the in-ear electrode, and further based on second electrical signals that correspond to brain activity of the user in response to the predetermined audible feature, and that are captured by a second electrode included in a headset wearable by the user.

* * * * *